United States Patent
Wei

(10) Patent No.: US 10,947,136 B2
(45) Date of Patent: Mar. 16, 2021

(54) WATER PURIFICATION APPARATUS FOR DENTAL TREATMENT

(71) Applicant: Li Lin Wei, Kaohsiung (TW)

(72) Inventor: Li Lin Wei, Kaohsiung (TW)

(73) Assignee: Lian Medical Protection Equipment Co., Ltd, Kaohsiung (TW)

( * ) Notice: Subject to any disclaimer, the term of this patent is extended or adjusted under 35 U.S.C. 154(b) by 0 days.

(21) Appl. No.: 16/835,300

(22) Filed: Mar. 31, 2020

(65) Prior Publication Data

US 2020/0223722 A1 Jul. 16, 2020

(51) Int. Cl.
*C02F 1/68* (2006.01)
*C02F 1/50* (2006.01)
*B01F 3/08* (2006.01)
*C02F 103/00* (2006.01)
*A61C 1/00* (2006.01)

(52) U.S. Cl.
CPC ............ *C02F 1/686* (2013.01); *B01F 3/0865* (2013.01); *C02F 1/50* (2013.01); *A61C 1/0076* (2013.01); *B01F 2215/0027* (2013.01); *C02F 2103/006* (2013.01); *C02F 2209/29* (2013.01); *C02F 2209/40* (2013.01)

(58) Field of Classification Search
CPC ............ B01F 2215/0027; B01F 3/0861; B01F 3/0865; B01F 15/00136; B01F 15/00253; B01F 15/0416; B01F 3/088; C02F 1/50; C02F 1/686; C02F 2303/04; C02F 2307/14; C02F 1/441; C02F 1/76; C02F 2103/006; C02F 2103/026; C02F 2209/005; C02F 2209/04; C02F 2209/05; C02F 2209/06; C02F 2209/29; C02F 2209/40; C02F 2209/42; A61C 1/0076; G05D 11/001
See application file for complete search history.

(56) References Cited

U.S. PATENT DOCUMENTS

| | | | |
|---|---|---|---|
| 6,790,427 B2 * | 9/2004 | Charles | B01F 5/0057 422/129 |
| 8,893,927 B2 * | 11/2014 | Olson | B01F 5/0496 222/162 |
| 2006/0051285 A1 * | 3/2006 | Hawker | A61L 2/18 423/477 |
| 2015/0090645 A1 * | 4/2015 | Black | B01F 3/088 210/137 |

* cited by examiner

*Primary Examiner* — Terry K Cecil

(57) ABSTRACT

A water purification apparatus includes a water inlet; a medicine mixing device in fluid communication with the water inlet; and a water outlet interconnected to the medicine mixing device and a dental treatment center. The medicine mixing device includes a medicine storage for storing antiseptic solution, a mixing unit interconnected to the water inlet, the water outlet, and the medicine storage, and a controller interconnected to the water inlet and the medicine storage. The controller includes a sensor and a microprocessor. The controller sends the antiseptic solution from the medicine storage to the mixing unit and controls a volume of water flowing from the water inlet to the mixing unit. The microprocessor instructs the controller to control a volume of the antiseptic solution supplied from the medicine storage to the mixing unit based on a signal sensed by the sensor.

1 Claim, 5 Drawing Sheets

WATER PURIFICATION APPARATUS FOR DENTAL TREATMENT

BACKGROUND OF THE INVENTION

1. Field of the Invention

The invention relates to water purification and more particularly to a water purification apparatus for supplying clean sterilized water to treatment units in a dental treatment center.

2. Description of Related Art

It is typical of preventing water tubes of a dental treatment center from being contaminated by microorganisms. Further, laws governing water flowing through the water tubes are promulgated in many countries. It is often that microorganisms (e.g., bacteria) may fall from the mouth of a patient in a dental treatment. The bacteria may cause inflammation in the patient particularly for patients having poor health. To the worse, an infected patient may die due to cardiovascular diseases. Thus, it is important of supplying sterilized clean water to a dental treatment center.

However, conventional dental treatment centers have the following drawbacks in terms of water supply: manual monitoring of the quality of water is required. This is not only time consuming but also labor intensive. Further, it cannot guarantee water safety due to errors. Microorganisms may grow in the water tubes due to limited manual sterilization. Concentration of antiseptic solution is adjusted manually and it is reliability is not guaranteed. Thus, the antiseptic solution may smell.

Thus, the need for improvement still exists.

SUMMARY OF THE INVENTION

It is therefore one object of the invention to provide a water purification apparatus comprising a water inlet; a medicine mixing device being in fluid communication with the water inlet; and a water outlet connected to the medicine mixing device; wherein the medicine mixing device includes a medicine storage for storing antiseptic solution, a mixing unit interconnected to the water inlet, the water outlet, and the medicine storage, and a controller interconnected to the water inlet and the medicine storage; the controller includes a sensor disposed on the mixing unit, and a microprocessor electrically interconnected to the sensor and the controller; the controller is configured to send the antiseptic solution from the medicine storage to the mixing unit and control a volume of water flowing from the water inlet to the mixing unit; and the microprocessor is configured to instruct the controller to control a volume of the antiseptic solution supplied from the medicine storage to the mixing unit based on a signal representing liquid in the mixing unit transmitted from the sensor.

Preferably, the medicine mixing device is configured to detach from the water outlet so that water is configured to flow from the water inlet to the mixing unit, and the controller is configured to control the volume of the antiseptic solution flowing from the medicine storage to the mixing unit, thereby performing an automatic medicine mixing and microorganisms killing operation.

Preferably, the antiseptic solution is chlorine dioxide.

Preferably, the controller further comprises an on/off switch.

Preferably, the controller further comprises a first motor operatively interconnected to the medicine storage and the microprocessor, and an electromagnetic valve interconnected to the mixing unit and the water inlet and electrically connected to the microprocessor.

Preferably, the medicine storage includes a shell, a bladder in the shell for containing gas and the antiseptic solution, and a cap on tops of both the bladder and the shell; and wherein the bladder is in fluid communication with the mixing unit, and a size of the bladder is configured to decrease in response to less volume of the antiseptic solution or increase in response to greater volume of the antiseptic solution.

Preferably, the controller further comprises a display operatively connected to the sensor, the display being configured to show an oxygen-reduction potential (ORP), a pH value, or a conduction value.

Preferably, the sensor is a liquid level sensor and a value sensed by the sensor is configured to transmit to the microprocessor which controls the first motor to control a flow rate of the antiseptic solution into the mixing unit and controls the electromagnetic valve to control a flow rate of the water into the mixing unit.

Preferably, the controller further comprises a second motor disposed between the water outlet and the mixing unit, and a pressure switch disposed on the second motor and controlled by the microprocessor to activate the second motor to control the flow rate of the antiseptic solution from the mixing unit to the water outlet; and wherein the controller is configured to automatically or manually activate the first motor to control the flow rate of the antiseptic solution into the mixing unit, and activate the second motor to control the flow rate of the antiseptic solution out of the mixing unit by setting.

The invention has the following advantages and benefits in comparison with the conventional art:

Water supplied to the consumption ends is sterilized clean water. An optimum volume of antiseptic solution is supplied to the mixing unit. The consumed water is hygienic. Further, a dentist or patient may use the sterilized clean water without worrying about safety.

It is automatically controlled. Components such as microprocessor and controller cooperate to mix water and antiseptic solution in an optimum ratio by means of a sensor. Manual operation is greatly decreased. Labor cost of monitoring quality of water is also greatly decreased.

Water is subject to oxygen-reduction adjustment. Water is sterilized by the antiseptic solution with fouling being formed in the pipes. The sensor can sense ORP for monitoring purpose. Thus, the sterilized clean water may prolong the useful life of the treatment units in the dental treatment center.

Installation is simple. Modification of the original dental treatment center is not required. It is environmentally friendly. The invention can be implemented by adding some components to the original dental treatment center. It is easy and simple.

The above and other objects, features and advantages of the invention will become apparent from the following detailed description taken with the accompanying drawings.

DETAILED DESCRIPTION OF THE INVENTION

Figure 1:
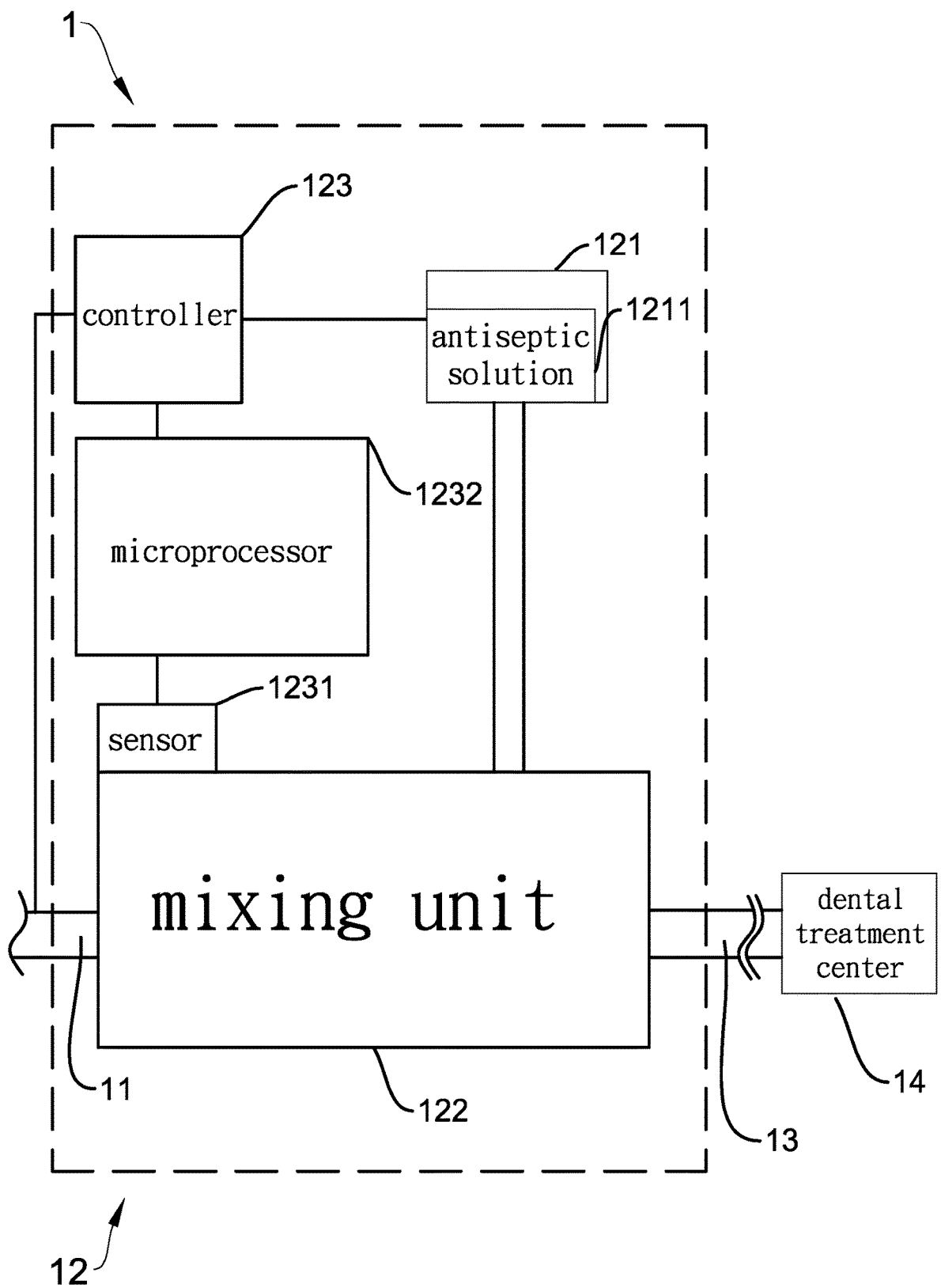
FIG. 1 is a block diagram of a water purification apparatus for dental treatment according to the invention.
Figure 2:
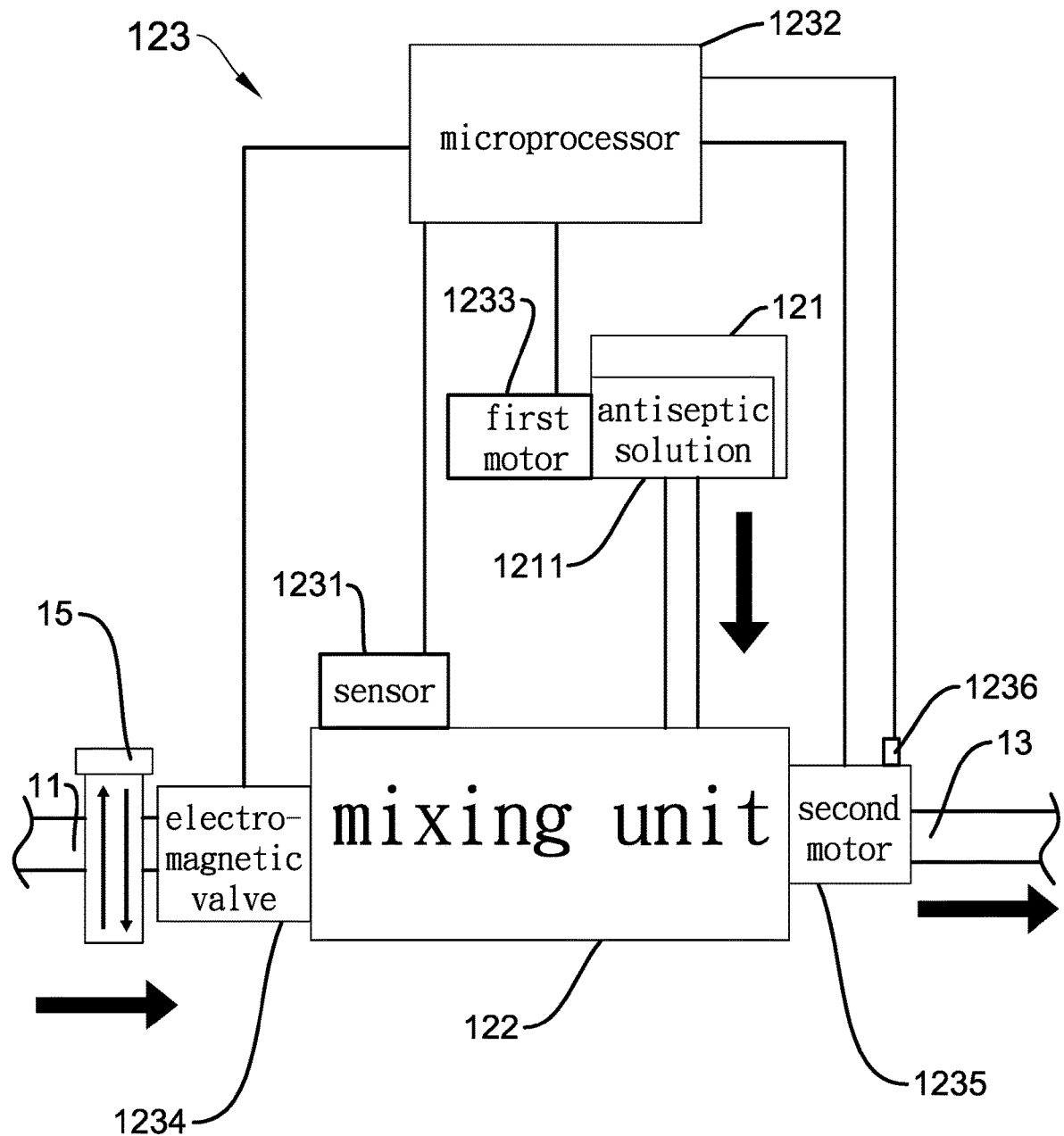
FIG. 2 is a block diagram showing a medicine mixing operation of the water purification apparatus.

Referring to FIGS. 1 and 2, a water purification apparatus 1 for dental treatment in accordance with the invention comprises a water inlet 11, a medicine mixing device 12 being in fluid communication with the water inlet 11, and a water outlet 13 interconnected to the medicine mixing device 12 and a dental treatment center 14. The medicine mixing device 12 includes a medicine storage 121 for storing antiseptic solution 1211, a mixing unit 122 interconnected to the water inlet 11, the water outlet 13, and the medicine storage 121, and a controller 123 interconnected to the water inlet 11 and the medicine storage 121. The controller 123 includes a sensor 1231 disposed on the mixing unit 122, and a microprocessor 1232 electrically interconnected to the sensor 1231 and the controller 123. The controller 123 may be activated to send the antiseptic solution 1211 from the medicine storage 121 to the mixing unit 122 and control the volume of the water flowing from the water inlet 11 to the mixing unit 122. Specifically, the microprocessor 1232 instructs the controller 123 to control the volume of the antiseptic solution 1211 sent from the medicine storage 121 to the mixing unit 122 based on a signal representing liquid in the mixing unit 122 transmitted from the sensor 1231, and control the volume of the water flowing from the water inlet 11 to the mixing unit 122. This has the following advantages: Microorganisms of the teeth can be killed by an optimum volume of antiseptic. No smell. Labor is saved. Water is clean. Time for monitoring the antiseptic solution is greatly decreased.

As shown in FIG. 2 specifically, a reverse osmosis (RO) water filter 15 is provided in the water inlet 11 for removing solids from water so that clean water can flow to the mixing unit 122.

The medicine mixing device 12 is adapted to detach from the water outlet 13. Thus, water can flow from the water inlet 11 to the mixing unit 122 directly. Further, the controller 123 controls the volume of the antiseptic solution 1211 flowing from the medicine storage 121 to the mixing unit 122. This is an automatic medicine mixing and microorganisms killing operation. In other words, the medicine mixing device 12 may be activated to mix water with the antiseptic solution 1211 to dilute the antiseptic solution 1211 to be one having an optimum concentration which is stored in the medicine storage 121. The antiseptic solution 1211 can be used to prevent the growth of microorganisms in the pipes. Alternatively, the antiseptic solution 1211 can be used to wash hands or clean floor.

The antiseptic solution 1211 is chlorine dioxide which has been widely used for bleaching purposes in the paper industry, and for treatment of drinking water. More recent developments have extended its application into food processing, disinfection of premises and vehicles, mold eradication, air disinfection and odor control, treatment of swimming pools, dental applications, and wound cleansing. The controller 123 controls the volume of the antiseptic solution (e.g., chlorine dioxide) 1211 flowing from the medicine storage 121 to the mixing unit 122. Also, microorganisms in water of the water outlet 13 are killed. Thus, water supplied to the dental treatment center is clean and safe.

The controller 123 is provided with an on/off switch (not shown) which can be manually moved to an on position to begin the medicine mixing and the microorganisms killing operation of the invention. Further, its operation time can set so that the medicine mixing and the microorganisms killing operation can be stopped when the predetermined time is reached. Alternatively, when the on/off switch is manually moved to an off position, water may flow from the water inlet 11 to the water outlet 13 through the mixing unit 122 bypassing the pipes (i.e., without being sterilized). This is a flexible measure.

The controller 123 further comprises a first motor 1233 operatively interconnected to the medicine storage 121 and the microprocessor 1232, and an electromagnetic valve 1234 interconnected to the mixing unit 122 and the water inlet 11 and electrically connected to the microprocessor 1232. The first motor 1233 is activated by the microprocessor 1232 to flow the antiseptic solution 1211 to the mixing unit 122. The electromagnetic valve 1234 is activated by the microprocessor 1232 to control the volume of water flowing from the water inlet 11 flowing to the mixing unit 122. The microprocessor 1232 controls both the first motor 1233 and the electromagnetic valve 1234 based on a signal representing liquid in the mixing unit 122 transmitted from the sensor 1231.

A display (not shown) is provided on the controller 123 and operatively connected to the sensor 1231. The display is used to show ORP, pH values, or conduction value. A user may view the display to understand the quality of liquid in the mixing unit 122. Thus, the user may manually operate the controller 123 to control the flow rate of the water into the mixing unit 122.

The sensor 1231 is one of an ORP sensor, a flow meter, a pH meter, or a conduction value meter and a value sensed by the sensor 1231 is transmitted to the display for display.

Alternatively, the sensor 1231 is a liquid level sensor and a value sensed by the sensor 1231 is transmitted to the microprocessor 1232 which in turn controls the first motor 1233 to control the flow rate of the antiseptic solution 1211 into the mixing unit 122 and controls the electromagnetic valve 1234 to control the flow rate of the water into the mixing unit 121.

The controller 123 is a Venturi tube for pneumatically controlling the flow rate of the antiseptic solution 1211 into the mixing unit 122.

The controller 123 further comprises a second motor 1235 provided between the water outlet 13 and the mixing unit 122. The second motor 1235 is used to supply clean water from the mixing unit 122 to the water outlet 13 as controlled by the microprocessor 1232. Thus, the flow rate of the clean water flowed from the water outlet 13 to the dental treatment center 14 can be controlled. A pressure switch 1236 is provided on the second motor 1235 and activated by the microprocessor 1232 to control the second motor 1235.

The controller 123 is adapted to automatically or manually activate the first motor 1233 to control the flow rate of the antiseptic solution 1211 into the mixing unit 122, and activate the second motor 1235 to control the flow rate of the antiseptic solution 1211 out of the mixing unit 122 by setting. Alternatively, the controller 123 is adapted to manually activate the second motor 1235 to control the flow rate of the antiseptic solution 1211 out of the mixing unit 122. In brief, a user may operate the microprocessor 1232 to control the flow rate of the antiseptic solution 1211.

Figure 3:
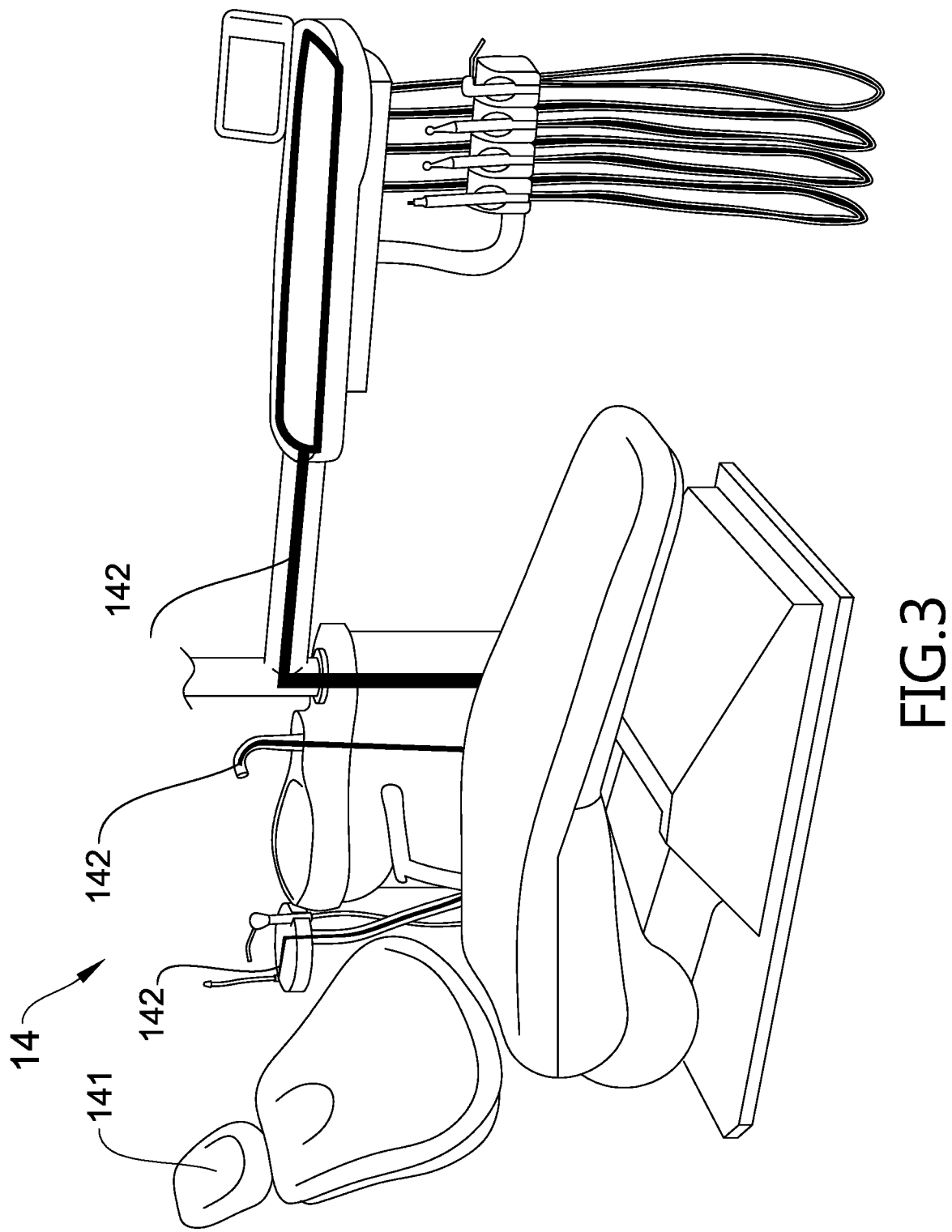
FIG. 3 is a graphic illustration of the dental treatment center.

Referring to FIG. 3 in conjunction with FIGS. 1 and 2, a dental treatment center 14 is shown. The dental treatment center 14 includes a patient chair 141 and a water tube 142 being in fluid communication with the water outlet 13. The water tube 142 is used to convey sterilized clean water from the water outlet 13 to each outlet adjacent to the patient chair 141. A dentist or a patient may use the sterilized clean water flowed from the outlet for consumption. This is hygienic. Further, the clean water may prolong the useful life of treatment units in the dental treatment center 14 by preventing fouling from being formed thereon.

Figure 4:
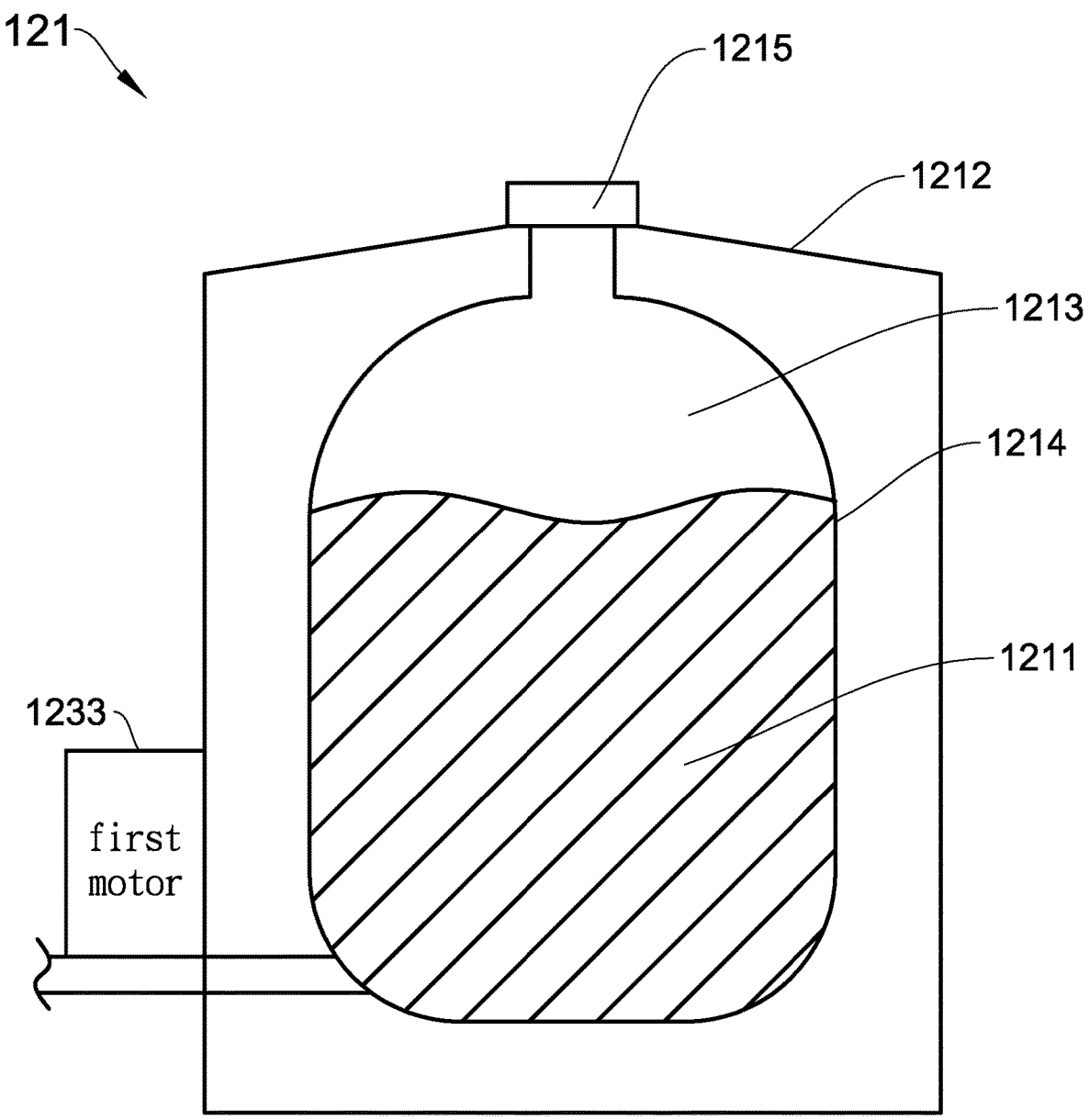
FIG. 4 is a graphic illustration of the medicine storage.
Figure 5:
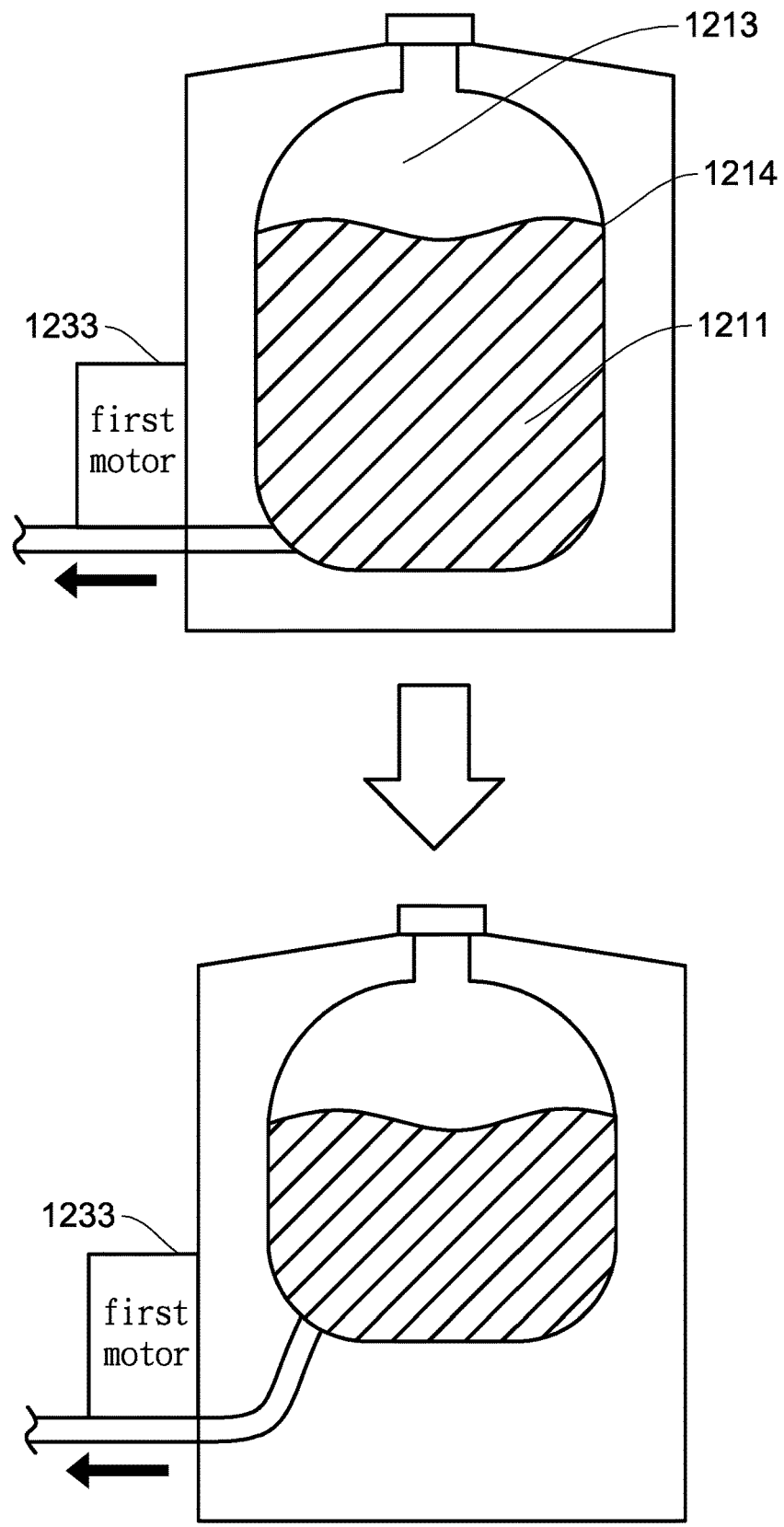
FIG. 5 is a graphic illustration of a medicine storage operation of the medicine storage.

Referring to FIGS. 4 and 5 in conjunction with FIGS. 1 and 2, the medicine storage 121 includes a shell 1212, a bladder 1214 in the shell 1212 for containing gas 1213 and the antiseptic solution 1211, and a cap 1215 on tops of both the bladder 1214 and the shell 1212. The bladder 1214 is in fluid communication with the mixing unit 122. The first motor 1233 controls the rate of the antiseptic solution 1211 flowing into the mixing unit 122. Size of the bladder 1214 may decrease in response to less volume of the antiseptic solution 1211 or increase in response to greater volume of the antiseptic solution 1211. The volume of the gas 1213 is a constant. Thus, the probability of evaporating the antiseptic solution 1211 to form gas 1213 is greatly decreased. Concentration of the antiseptic solution 1211 can be kept at a predetermined value for user safety and optimum sterilization purposes.

As shown in FIGS. 1 to 3 specifically, the invention envisages that the controller 123 controls the flow rate by means of the ORP, and uses the sensor 1231 as the ORP sensor. Its operation is described in detail below. Tap water is filtered by the RO water filer 15 to become clean water which is supplied to the mixing unit 122. The flow rate of the clean water into the mixing unit 122 can be controlled by the electromagnetic valve 1234.

Next, the sensor 1231 senses the ORP of the mixing unit 122 and transmits a signal representing liquid in the mixing unit 122 to the microprocessor 1232. The microprocessor 1232 controls the first motor 1233 based on the received signal. The first motor 1233 activates to supply the antiseptic solution 1211 at a predetermined flow rate to the mixing unit 122. Next, clean water is mixed with the antiseptic solution 1211 in the mixing unit 122. Next, the sterilized clean water is discharged to the water outlet 13 by the second motor 1235 as controlled by the microprocessor 1232. Finally, the sterilized clean water is supplied to the water tube 142 for consumption.

Finally, the water tube 142 conveys the sterilized clean water to each outlet of adjacent to the patient chair 141. A dentist or a patient may use the sterilized clean water flowed from the outlet for consumption. This is hygienic. Further, the sterilized clean water may prolong the useful life of the treatment units in the dental treatment center 14 by preventing fouling from being formed thereon.

The invention has the following advantages and benefits in comparison with the conventional art:

Water supplied to the consumption ends is sterilized clean water. An optimum volume of antiseptic solution is supplied to the mixing unit. The consumed water is hygienic. Further, a dentist or patient may use the sterilized clean water without worrying about safety.

It is automatically controlled. Components such as microprocessor and controller cooperate to mix water and antiseptic solution in an optimum ratio by means of a sensor. Manual operation is greatly decreased. Labor cost of monitoring quality of water is also greatly decreased.

Water is subject to oxygen-reduction adjustment. Water is sterilized by the antiseptic solution with fouling being formed in the pipes. The sensor can sense ORP for monitoring purpose. Thus, the sterilized clean water may prolong the useful life of the treatment units in the dental treatment center.

Installation is simple. Modification of the original dental treatment center is not required. It is environmentally friendly. The invention can be implemented by adding some components to the original dental treatment center. It is easy and simple.

While the invention has been described in terms of preferred embodiments, those skilled in the art will recognize that the invention can be practiced with modifications within the spirit and scope of the appended claims.

What is claimed is:

1. A water purification apparatus, comprising:
   a water inlet;
   a medicine mixing device being in fluid communication with the water inlet; and
   a water outlet connected to the medicine mixing device;
   wherein the medicine mixing device includes a medicine storage for storing antiseptic solution, a mixing unit interconnected to the water inlet, the water outlet, and the medicine storage, and a controller interconnected to the water inlet and the medicine storage;
   the controller includes a sensor disposed on the mixing unit, a microprocessor electrically interconnected to both the sensor and the controller, an on/off switch, a first motor operatively interconnected to the medicine storage and the microprocessor, an electromagnetic valve interconnected to the mixing unit and the water inlet and electrically connected to the microprocessor, a display operatively connected to the sensor, a second motor disposed between the water outlet and the mixing unit, and a pressure switch disposed on the second motor;
   the controller is configured to send the antiseptic solution from the medicine storage to the mixing unit, control a volume of water flowing from the water inlet to the mixing unit, and automatically activate the first motor to control the flow rate of the antiseptic solution into the mixing unit;
   the pressure switch is controlled by the microprocessor to activate the second motor to control the flow rate of the antiseptic solution from the mixing unit to the water outlet;
   the microprocessor is configured to instruct the controller to control a volume of the antiseptic solution supplied from the medicine storage to the mixing unit based on a signal representing liquid in the mixing unit transmitted from the sensor;
   the controller is configured to control the volume of the antiseptic solution flowing from the medicine storage to the mixing unit, thereby performing an automatic medicine mixing and microorganisms killing operation;
   the medicine storage includes a shell, a bladder in the shell for containing gas and the antiseptic solution, and a cap on tops of both the bladder and the shell;
   the bladder is in fluid communication with the mixing unit, and a size of the bladder is configured to decrease in response to less volume of the antiseptic solution or increase in response to greater volume of the antiseptic solution.

* * * * *